(12) United States Patent
Berry et al.

(10) Patent No.: US 10,688,472 B1
(45) Date of Patent: Jun. 23, 2020

(54) METHOD OF EXHAUST CLEANUP FROM COMBUSTION PROCESSES USING MIXED-METAL OXIDE BASED CATALYSTS

(71) Applicant: Energy, United States Department of, Washington, DC (US)

(72) Inventors: David A. Berry, Mount Morris, PA (US); Dushyant Shekhawat, Morgantown, WV (US); Daniel J. Haynes, Morgantown, WV (US); Mark W. Smith, Fairmont, WV (US)

(73) Assignee: U.S. Department of Energy, Washington, DC (US)

( * ) Notice: Subject to any disclaimer, the term of this patent is extended or adjusted under 35 U.S.C. 154(b) by 0 days.

(21) Appl. No.: 15/994,201

(22) Filed: May 31, 2018

Related U.S. Application Data

(60) Provisional application No. 62/514,355, filed on Jun. 2, 2017.

(51) Int. Cl.
| | |
|---|---|
| *B01J 23/00* | (2006.01) |
| *B01J 35/00* | (2006.01) |
| *B01J 35/02* | (2006.01) |
| *B01J 35/04* | (2006.01) |
| *F01N 3/035* | (2006.01) |
| *F01N 3/10* | (2006.01) |
| *B01D 53/94* | (2006.01) |
| *F01N 3/08* | (2006.01) |

(52) U.S. Cl.
CPC .......... *B01J 23/002* (2013.01); *B01D 53/945* (2013.01); *B01J 35/0006* (2013.01); *B01J 35/026* (2013.01); *B01J 35/04* (2013.01); *F01N 3/035* (2013.01); *F01N 3/101* (2013.01); *B01D 2255/40* (2013.01); *F01N 3/0814* (2013.01); *F01N 2570/14* (2013.01)

(58) Field of Classification Search
None
See application file for complete search history.

(56) References Cited

U.S. PATENT DOCUMENTS

| | | | |
|---|---|---|---|
| 5,208,204 A | 5/1993 | Subramanian et al. | |
| 5,820,833 A * | 10/1998 | Kawamura | ........ B01D 46/2411 422/174 |
| 5,925,590 A | 7/1999 | White et al. | |
| 6,355,093 B1 | 3/2002 | Schwartz et al. | |
| 7,297,656 B2 | 11/2007 | Zhang et al. | |
| 8,133,463 B1 * | 3/2012 | Berry | ..................... B01J 23/002 252/373 |
| 8,496,896 B2 | 7/2013 | Golden et al. | |
| 8,685,351 B2 | 4/2014 | Yang et al. | |
| 8,685,352 B2 | 4/2014 | Golden et al. | |
| 8,728,974 B2 | 5/2014 | Yang et al. | |

(Continued)

*Primary Examiner* — Anita Nassiri-Motlagh
(74) *Attorney, Agent, or Firm* — Jacob A. Heafner; Daniel D. Park; Brian J. Lally

(57) ABSTRACT

One or more embodiments relates to a method of catalytically converting a reactant gas mixture for pollution abatement of products of hydrocarbon fuel combustion. The method provides substituted mixed-metal oxides where catalytically active metals are substituted within the crystal lattice to create an active and well dispersed metal catalyst available to convert the reactant gas mixture. Embodiments may be used with gasoline and diesel fueled internal combustion engine exhaust, although specific embodiments may differ somewhat for each.

14 Claims, 3 Drawing Sheets

(56) References Cited

U.S. PATENT DOCUMENTS

| | | | |
|---|---|---|---|
| 8,906,823 B2 | 12/2014 | Yang et al. | |
| 9,067,192 B2 | 6/2015 | Yang et al. | |
| 9,150,476 B1 | 10/2015 | Shekhawat et al. | |
| 9,861,964 B1 | 1/2018 | Nazarpoor et al. | |
| 2005/0013758 A1* | 1/2005 | James | C01G 19/006 |
| | | | 423/263 |
| 2014/0037524 A1* | 2/2014 | Mikita | B01D 53/945 |
| | | | 423/213.2 |
| 2014/0357479 A1 | 12/2014 | Nazarpoor et al. | |
| 2015/0209760 A1* | 7/2015 | Asanuma | B01J 23/63 |
| | | | 502/304 |

* cited by examiner

METHOD OF EXHAUST CLEANUP FROM COMBUSTION PROCESSES USING MIXED-METAL OXIDE BASED CATALYSTS

RELATED APPLICATIONS(S)

The present patent/application claims priority to U.S. Provisional Patent No. 62/514,355 filed Jun. 2, 2017, and titled "METHOD OF EXHAUST CLEANUP FROM COMBUSTION PROCESSES USING MIXED-METAL OXIDE BASED CATALYSTS."

GOVERNMENT INTEREST

The United States Government has rights in this invention pursuant to the employer-employee relationship of the Government to the inventors as U.S. Department of Energy employees and site-support contractors at the National Energy Technology Laboratory.

FIELD OF THE INVENTION

One or more embodiments relate to a method of catalytically converting a reactant gas mixture for pollution abatement of products of hydrocarbon fuel combustion. The method provides substituted mixed-metal oxides where catalytically active metals are substituted within the crystal lattice to create an active and well dispersed metal catalyst available to convert the reactant gas mixture. Embodiments may be used with gasoline and diesel fueled internal combustion engine exhaust, although specific embodiments may differ somewhat for each.

BACKGROUND OF THE INVENTION

Nitrogen oxides ($NO_x$), carbon monoxide (CO), and unconverted (unburned) hydrocarbons (HC) are toxic and environmentally damaging pollutants found in the exhaust gas from internal combustion engines. Catalytic converters are used to decrease these pollutants by oxidizing HC, soot, and CO to $CO_2$ and water, and by reducing nitrogen oxides to $N_2$. Both oxidation and reduction reactions must occur in catalytic converters in order to remove these pollutants in a single system. Most gasoline engines use a three way catalyst (TWC) system to remove CO, HC and $NO_x$ while diesel engines use a four way catalyst to convert those three pollutants plus organic particulates (PM).

For effective abatement of these pollutants, most catalytic converters utilize one or more platinum group metals (PGM) due to their efficiencies for catalyzing these oxidation/reduction reactions. With the ever stricter standards for acceptable emissions, the demand on PGM continues to increase, placing a strain on the supply of PGM, which in turn drives up the cost of PGM and therefore catalysts and catalytic converters. Thus, there is a need to develop advanced catalysts and methods of synthesizing these catalysts that utilize these PGMs in a much more efficient way to increase the longevity of the catalytic converters which will reduce their overall cost.

With changes in engine technologies, the catalytic materials used in gasoline and diesel converters have also changed. These engine advancements require new materials that are highly active and thermally stable under a wide range of exhaust gas conditions. To abide by the EPA exhaust regulations there is a need for new catalytic materials that operate (light-off) at lower temperatures to reduce exhaust pollutant emissions during vehicle start-up, particularly in cold temperatures. Start-up emissions may be reduced by moving the catalyst closer to the engine exhaust manifold, like close-coupled converters, but this results in very high catalyst temperatures under normal driving conditions that are detrimental to the conventional catalysts in these close-coupled converters.

For the foregoing reasons, it would be advantageous to provide a method for converting the pollutants from a reactant gas mixture of exhaust by supplying the reactant gas mixture to suitable catalysts. The suitable catalysts include mixed-metal oxides such as pyrochlores and brownmillerites, where the mixed-metal oxide crystal lattices are substituted. These substituted mixed-metal oxides along with the methods and systems incorporating them, provide conversion of pollutants using low amounts of PGM catalysts while possessing synergistic redox functions that yield enhanced activity and performance under both lean and rich engine conditions.

These and other objects, aspects, and advantages of the present disclosure will become better understood with reference to the accompanying description and claims.

SUMMARY OF THE INVENTION

Provided herein is a method of catalytically converting a reactant gas mixture using a substituted mixed-metal oxide (MMO). In one embodiment, the substituted MMO is a pyrochlore having the composition $A_{2-w-x}A'_{w}A''_{x}B_{2-y-z}B'_{y}B''_{z}O_{7-\Delta}$. In another embodiment, the substituted MMO is a brownmillerite having the composition $A_{2-x}A'_{x}B_{2-y}B'_{y}O_{5-z}$.

Embodiments are applicable for use in converting pollutants in gasoline and diesel engine exhaust, although specific embodiments may differ somewhat for each. Treatment of the engine exhaust requires oxidation of hydrocarbons, soot particles, carbon monoxide, and reduction of nitrogen oxides when the engine is operated at both lean and rich stoichiometric air/fuel ratios. As noted, the method of this invention uses one or more substituted (modified) MMO type crystalline catalysts (pyrochlore, fluorites, perovskites, brownmillerites, and the like). Optionally, the catalyst system may utilize the catalytically active metals and/or promoters substituted into the mixed-metal type crystal lattice or supported on the lattice. These catalysts may be mixed with inorganic materials or put onto supports that enhances the overall oxygen transport and oxygen storage capability of the catalyst system to increase its effectiveness.

The method includes supplying a reactant gas mixture comprising unconverted hydrocarbons, $CO_x$, $NO_x$, particulate matter, or combinations thereof and providing a substituted MMO catalyst. The method further includes contacting the substituted MMO catalyst with the reactant gas mixture and maintaining the reactant gas mixture and the substituted MMO catalyst at conditions of temperature (20-2000° C.), pressure (0.1-10 MPa), and weight hourly space velocity (10-10$^6$ scc/$g_{catalyst}$/hr) during the contacting to promote the conversion of the unconverted hydrocarbons, $CO_x$, $NO_x$, particulate matter to produce a gaseous mixture comprising $H_2O$, $CO_2$, $N_2$.

Another embodiment relates to the substituted MMO catalyst. The substituted MMO catalyst may include an inert support. Further, the substituted MMO catalyst may comprise where the substituted MMO is a first catalytically active material, and where the MMO catalyst further comprises a second catalytically active material, thus providing a catalyst having two active components.

BRIEF DESCRIPTION OF THE DRAWINGS

These and other features, aspects, and advantages of the multiple embodiments of the present invention will become better understood with reference to the following description, appended claims, and accompanied drawings where:

DETAILED DESCRIPTION OF THE INVENTION

The following description is provided to enable any person skilled in the art to use the invention and sets forth the best mode contemplated by the inventor for carrying out the invention. Various modifications, however, will remain readily apparent to those skilled in the art, since the principles of the present invention are defined herein specifically to provide description of a catalyst system for pollution abatement of an internal combustion engine exhaust stream. One or more embodiments consistent with embodiments of the present invention relate to materials, methods to prepare, and methods for pollution abatement of an internal combustion engine exhaust stream.

This invention relates generally to methods to catalytically convert reactant gas streams by contacting a supplied reactant gas stream with a substituted MMO catalyst at temperature, pressure, and flow rate conditions to convert pollutants in the reactant gas stream. The substituted MMO catalysts when contacted with internal combustion engine (ICE) exhaust gases can simultaneously reduce nitrogen oxides ($NO_x$) to $N_2$ and oxidize carbon monoxide (CO), soot particles, and unconverted hydrocarbons (unburned fuel) to $CO_2$. The invention relates specifically to methods relying on mixed-metal oxide (MMO) catalysts using typically small amounts of palladium (Pd), platinum (Pt) and/or rhodium (Rh) incorporated into and/or deposited onto mixed-metal oxide (MMO) materials such as pyrochlores. MMO's such as pyrochlores are particularly useful in these applications because of their oxygen storage capacity, thermal stability, resistance to deactivation by sulfur, and ability to isomorphically substitute a certain amount of platinum group and transition metals in the crystal lattice.

MMO's provide the ability to isomorphically substitute active metals into the structure various elements that can interact at the surface with clusters of metal atoms. The properties of the MMO can thus be used to tailor the degree and type of interaction with an active metal comprising the metal site to catalyze the conversion of pollutants to specific end products. Within certain limits, such as ratio of atomic radii, a wide range of catalytically active metals such as Rh, Ru, and Ni can be substituted into MMO's and retain catalytic activity. Further, addition of small clusters of metallic sites deposited onto the substituted MMO containing structurally incorporated metallic sites provides the unique ability to tailor the distribution of active sites in order to improve product selectivity.

As noted supra, substituted MMO's have the ability to tailor various properties required to increase selectivity and conversion of hydrocarbons by partial substitutions into the oxide lattice. MMO's capable of lattice site substitution to provide the substituted MMO's include pyrochlore, brownmillerites, perovskites, fluorites, and weberites.

Figure 1:
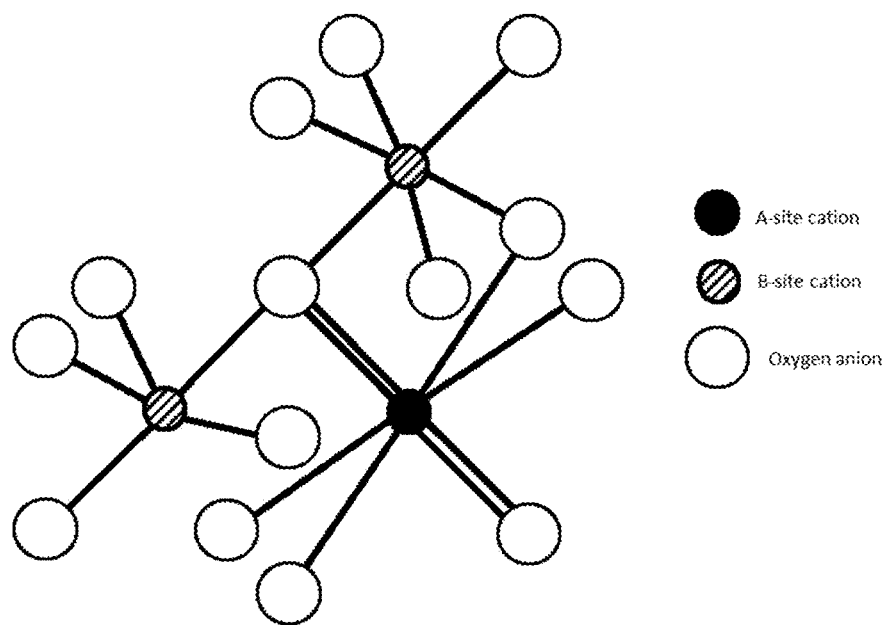
FIG. 1. illustrates a pyrochlore crystal lattice.

The instant disclosure establishes that a range of active and inactive elements may be substituted into an MMO lattice while maintaining the distinctive pyrochlore structure. A-site elements provide for improved oxygen-ion conductivity and carbon oxidation at elevated temperatures, limiting carbon accumulation during reactions, while B-site substitutions improve the catalytic activity of the material, and significantly reduce carbonaceous deposits on the pyrochlore catalyst. Additionally and significantly, the disclosure provides the range of active elements incorporated as a structural element within the MMO compositions, and achieve a structural stability under reaction conditions which allows for continued dispersion and separation of the active metals necessary for high catalytic activity The general formula for a pyrochlore is $A_2B_2O_7$ and is illustrated in FIG. 1. When substituted as within this disclosure to provide a substituted MMO, the general formula for the substituted catalyst is $A_{2-w-x}A'_wA''_xB_{2-y-z}B'_yB''_zO_{7-\Delta}$, which is a modified version of the general pyrochlore formula $A_2B_2O_7$.

A is a trivalent ion of an element selected from the group consisting of La, Ce, Pr, Nd, Pm, Sm, Eu, Gd, Tb, Dy, Er, Tm, Yb, Lu, Bi, Sc, Y, In, and Ti, A' is a trivalent ion of an element not equivalent to A and selected from the group consisting of, La, Ce, Pr, Nd, Pm, Sm, Eu, Gd, Tb, Dy, Er, Tm, Yb, Lu, Bi, Sc, Y, In, and Ti, and wherein $0 \leq w \leq 1$, A'' is a divalent ion selected from the group consisting of Mg, Ca, Sr, and Ba, and wherein $0 \leq x \leq 1$ and $w+x \leq 1$, B is a tetravalent ion of an element selected from the group consisting of Ti, Cr, Mn, Zr, Mo, Tc, Rh, Pd, Hf, Os, Ir, Pt, Si, Ge, Sn, and Pb, B' is a divalent, trivalent, or tetravalent ion of an element selected from the group consisting of Mo, Fe, Os, Ru, Co, Rh, Ir, Ni, Pd, Pt, Cu, Re, and V wherein if B' is a tetravalent element then B' is an element not equivalent to B and wherein $0 < y \leq 1$, B'' is a divalent, a trivalent, or a tetravalent ion of an element selected from the group consisting of Mg, Ca, Sr, Ba, Y, Ce, Re, Cr, Ti, Zr, Hf, Ni, Co, V, and Mo, wherein if B'' is a trivalent element, B'' is an element not equivalent to B', and if B'' is a tetravalent element, then B'' is an element not equivalent to B' or B, wherein $0 \leq z < 1$ and $y+Z \leq 1$, and $\Delta$ is a number that renders the composition charge neutral, and where an average ionic radius ratio of ions in A, A', and A''-site holding an 8-fold coordination with oxygen to ions B, B', and B'' site holding 6-fold coordination with oxygen is between 1.46 and 1.8.

Depending on the elements substituted into the structure, the substituted MMO pyrochlore can have the pure pyrochlore phase, or mixed phases—with pyrochlore as the predominant phase and fluorite and/or perovskite/other as secondary phases. These substituted materials allow the pyrochlore to be modified to interact in specific, different ways with a wide range of catalytically active metals supported on the pyrochlore.

The substitution and distribution thereof as described utilizes non-catalytically active metals for the B-site for which only a small amount (0.01-10 wt % of the total MMO molecular weight) have been substituted by the active metal, which occupies the B'-site. This substitution scheme provides an active and well dispersed metal bound in the crystal structure, allowing the pyrochlore crystal structure to remain stable under a wide range of operating conditions. Specifically, under high temperature, reducing conditions, catalyst as described in U.S. Pat. No. 7,297,656 do not retain their crystal structure, but break down into simple oxides ($A_2O_3$) with reduced metal deposits on the surface. However, the substituted MMO presented herein hold the more stable crystal structure while continuing to function catalytically. Additionally, mixed-metal oxides such as pyrochlores, brownmillerites, or mixtures thereof, may also be utilized in a variety of forms including but not limited to powders, pellets, foam catalysts, monolithic catalysts, wall-deposited (tubular or planar), deposited fiber, or any other geometric shape catalyst system.

Where brownmillerite has the general formula $A_2B_2O_5$, the substituted MMO comprising brownmillerite has a composition $A_{2-x}A'_xB_{2-y}B'_yO_{5-z}$ where, A is one or more of an alkaline earth metal, A' is one or more of a lanthanide series metal, Y, or mixtures thereof, B is one or more of a transition metal, a Group 13 metal, or mixtures thereof, B' is one or more of a lanthanide series metal, Y, or mixtures thereof and, where $0 \le x \le 1$, $0 \le y \le 1$, $x+y>0$, and z is a number that renders the composition charge neutral.

In some embodiments, the catalyst formulations of the invention may contain other non-noble metal promoters and other oxygen storage/oxygen transfer promoters. The invention further relates to improved methods for making Pd, Pt and/or Rh and other non-noble metal containing pyrochlore materials for use within the disclosed method for treating an automotive exhaust.

The substituted MMO catalyst may comprise materials deposited onto the surface of the crystal lattice. In one embodiment, a transition metal, noble metal, or mixtures thereof are surface deposited onto a substituted MMO catalyst surface in order to improve catalytic conversion of reactant gases. In another embodiment, an alkaline metal, alkaline earth metal, lanthanide element, or mixtures thereof are deposited onto the surface of the substituted MMO catalyst in order to enhance important surface properties, such as basicity, to promote catalytic activity. In an exemplary substituted MMO catalyst, the transition metal Rh, Pt, and lanthanide La are deposited onto the surface of a pyrochlore, such that the surface deposited materials facilitate low temperature activation of pollutants and promotes metal particle stability and coking resistance.

Within the substituted MMO catalyst, the substituted MMO may be a pure phase or mixed phases. For example with a pyrochlore based substituted MMO catalyst where-pyrochlore is the predominant phase, an alternate pyrochlore, fluorite and/or perovskite secondary phases may be present. Thus in one embodiment, the substituted MMO catalyst may have a first catalyst such as a pyrochlore, and the substituted MMO catalyst may further comprise a second pyrochlore, simple oxide, perovskite, fluorite, weberite, brownmillerite, or mixtures thereof. These substituted materials allow the pyrochlore to be modified to interact in different ways with a wide range of catalytically active metals supported on the pyrochlore. However, the substituted MMO catalyst disclosed is expected to provide sufficient catalytic activity in the absence of other crystal phases or catalytic agents.

The substituted MMO catalyst may comprise self-supported substituted MMO catalytic material or may further comprise a support. The support may be a structural support such that the substituted MMO is structurally supported on a substrate such as aluminas, silicas, mixed-metal oxides, and other substrates known in the art, and combinations thereof. Further, the support may enhance catalytic performance. In one embodiment, a mixed-metal oxide support functions to enhance oxygen transfer of the catalytically active materials. For example the presence of zirconia-doped ceria can lower the oxidation temperature of the hydrocarbon species.

The substituted MMO catalysts may further comprise a material to facilitate conducting or storing oxygen. These MMOs have the capacity to provide lattice oxygen to participate in the reaction and prevent formation of carbon on the surface from the hydrocarbons. The oxygen is replenished to the lattice by the gas phase oxygen species.

Figure 2:
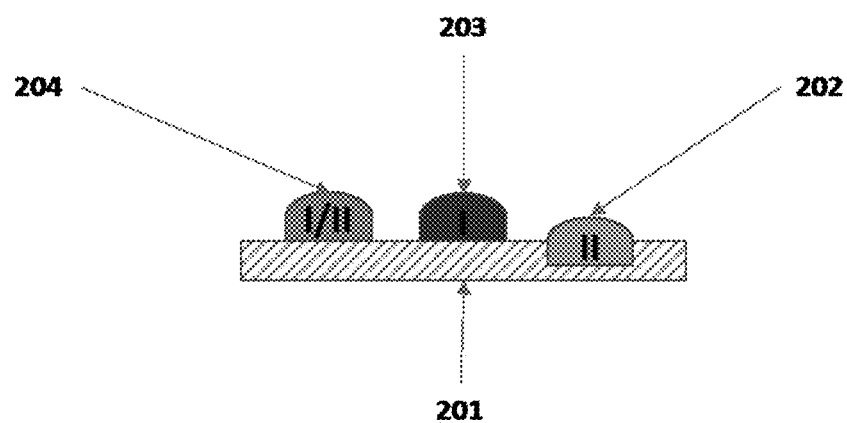
FIG. 2. illustrates a substituted MMO catalyst with a surface deposited second catalytically active material.

In one embodiment, the substituted MMO catalyst further comprises additional catalytically active materials. Within the embodiment, the substituted MMO, a substituted pyrochore for example, is a first catalytically active material. A second catalytically active material, for example Pt may be added to the first catalytically active material to improve hydrocarbon oxidation. The inclusion of the second catalytic material may provide for simultaneous oxidation and reduction activities by the substituted MMO catalyst. As in FIG. 2, the substituted MMO catalyst 201 comprises a substituted MMO pyrochlore having an active site 202 as the first catalytically active material and a surface deposited metal 203 as the second catalytically active material. Pollutants within the reactant gas stream are able to interact with the first catalytically active material through the surface absorption site 204 or by flowing through active sites for either material to facilitate contact between catalyst and pollutant reactants.

In addition, the reactant gas stream may comprise additional species to enhance reduction reactions. For example, urea, ammonia, or combinations thereof may be included to enhance reduction reactions. Materials may also be added to the MMO to act as regenerable or non-regenerable sorbent. An exemplary regenerable sorbent is a zeolite. For example, zeolites (i.e. NOx trap) may be incorporated into the substituted MMO catalyst, such that the sorbent absorbs the reactant gases during initial start-up of the combustor prior to the temperature of the substituted MMO catalyst rising to peak operational temperature. Once the substituted MMO catalyst rises to peak operational temperature, the catalyst is able to convert the reactant gas and regenerate the sorbent. In effect, the sorbent acts to capture and hold the pollutants in the reactant gas mixture until such time as the catalyst is best able to convert them.

Where the substituted MMO catalyst comprise multiple components such as the substituted MMO, a support, surface deposited materials, etc, the substituted MMO catalyst may be thought of as a multifunctional catalyst system (MFC). The MFC may have a layered structure, where the support serves as a base (first) layer and adds structural support and/or oxygen conducting properties to the system. The substituted MMO along with any incorporated substitutions and alternate phases is a primary (second) layer where it in contact with the base support later. The substituted MMO in the MFC functions as the primary catalytic material for conversion of the reactant gases. The MFC may further comprise a third layer where surface deposited materials as promoters act to enhance catalytic activity, provide additional reduction and oxidation capacity.

The MMO catalyst may be manufactured by known methods (U.S. Pat. No. 9,126,833). In most other catalyst systems, a structured monolithic support, with multiple flow channels, has material layers coated onto the support by means of a wash-coating process. Accordingly, the solids intended for a layer are suspended in water or in a solution made up of water and an organic solvent. The coating of this catalytic material on to the monolith can be achieved by multiple layer depending upon the activity of the catalyst and the desired performance. This layer could also be created using a metal salt solution in water instead of solid-in-liquid suspension followed by drying a calcination to create the metal oxide passivation layer in-situ.

In an exemplary catalyst system providing an ICE catalytic converter, within pollutant conversion portion of the catalytic converter, a first layer may be present. The first layer is preferably a metal oxide layer that provides a base coat that enhances oxygen storage/oxygen transfer and provides a primer coat that promotes adhesion of the substituted MMO catalyst. The need for this first layer and its properties will be dependent on the properties of the monolithic support and its material of construction. The suspension for this first layer may include, but is not limited to, inorganic oxides such as oxides of Zr, Ce, Y, La, Sr, Ca, Al, Mg, Ba, K, Ti, Fe, Cr, V, Mn, W, Ag, Zn, Mo, Pr, Sm, Gd.

The second layer coated onto the structured support is the substituted MMO catalyst containing the active components of the catalytic converter such as Rh, and/or Pt, and/or Pd and/or other promoter metals such as alkali metals, alkali-earth metals, rare earth metals, or mixtures thereof substituted into or supported onto the substituted MMO catalyst. This layer is applied by the same or a similar method as the first layer using techniques well-known in the catalyst industry. Coating of the substituted MMO catalyst onto the structured support is followed by drying and/or calcining to ensure the substituted MMO catalyst is firmly attached and bonded to the first metal oxide layer. Some of the metal oxides used in the first layer may be mixed with the substituted MMO catalyst to enhance the coating process, facilitate the adhesion of the substituted MMO catalyst to the sublayers and further promote reactions. To further enhance the low temperature conversion of exhaust gas pollutants, water-soluble salts of Pt, Pd and/or Rh may be added to the second layer by incipient wetness or a similar method. This would be followed by drying and/or calcination to affix the metals to the layer and facilitate uniform distribution.

The substituted MMO catalysts as described are provided for use in a method for catalytically converting a reactant gas mixture containing CO, unconverted hydrocarbons, and NOx. The reactant gas mixtures are products of hydrocarbon fuel combustion or oxidation processes. Exemplary hydrocarbon fuel combustion products are, for example, the exhaust products of internal combustion engines (ICE). Combustion of such fuels in the engines produces pollutants including unconverted hydrocarbons, $CO_x$, $NO_x$, and particulate matter such as soot. During catalytic conversion as is done in an ICE catalytic converter, the pollutants are converted to $H_2O$, $CO_2$, $N_2$ or combinations thereof.

The reactant gas mixture comprising the exhaust products of hydrocarbon fuel combustion or oxidation processes necessarily has as constituent reactant gases unconverted hydrocarbons, $CO_x$, $NO_x$, particulate matter such as soot, or combinations thereof, which are considered pollutants. Typical reactant gas mixtures may further comprise relatively inert constituents such as $N_2$, $O_2$, $H_2O$, and other trace gases. In one embodiment, the reactant gas mixture may comprise a concentration of reactant gas in a range from about $10^{-6}$ to 1% by volume reactant gas/inert constituent. Preferably, the concentration of reactant gas ranges from about $10^{-4}$ to 0.1% by volume.

As noted above, the method may be practiced in the catalytic conversion of a reactant gas mixture of products from hydrocarbon fuel combustion or oxidation processes. Hydrocarbon fuel include, for example, natural gas; C2-C5 hydrocarbons; C6+ heavy hydrocarbons where C6+ heavy hydrocarbons include gasoline, diesel, jet fuels, JP fuels, tars, kerosene, or mixtures thereof; liquid oxygenated hydrocarbons where the oxygenated hydrocarbons include biodiesel, alcohols, aldehydes, ketones, dimethyl ether, or mixtures thereof; heavy and solid hydrocarbons where the heavy and solid hydrocarbons include tars, pitch, coal, biomass, or mixtures thereof; and the products of a reforming process where the reforming process includes steam reforming, partial oxidation, $CO_2$ reforming, or mixtures thereof. In particular, the method is applicable to the exhaust products of gasoline and diesel fueled engines.

The method includes supplying a reactant gas mixture comprising one or more pollutants and providing a substituted MMO catalyst. Supplying the reactant gas mixture is applied in order to present a reactant gas mixture to the substituted MMO catalyst to facilitate contact between the two. One suitable regime is a fixed bed reaction regime, in which the substituted MMO catalyst is retained within a reaction zone in a fixed arrangement and the reactant gas mixture is exhaust gas supplied through an ICE exhaust arrangement. Particles of the substituted MMO catalyst may be employed in the fixed bed regime, retained using fixed bed reaction techniques well known in the art. Alternatively, the substituted MMO catalyst may be in the form of a pellet, foam, honeycomb, monolith, or other geometry advantageous in facilitating contact. The substituted MMO catalyst may be supported on a substrate such as aluminas, silicas, and mixed-metal oxides, and other substrates known in the art.

Figure 3:
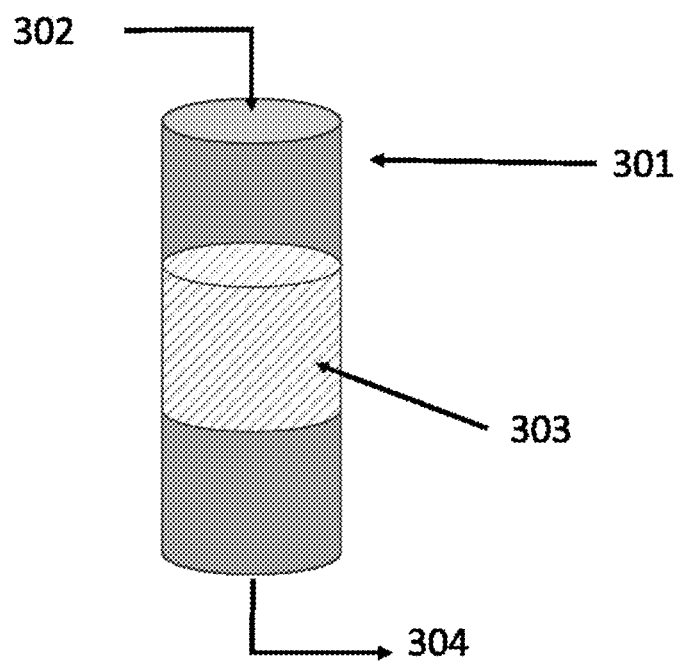
FIG. 3. illustrates a catalytic converter.

One example of a fixed bed type catalytic converter is illustrated in FIG. 3. The catalytic converter 301 acts as the reaction vessel and is supplied with a reactant gas mixture 302 comprising pollutants of unconverted hydrocarbons, CO, and NOx flowing into 301. Substituted MMO catalyst 303 is present within 301 such that it is available to contact 302 and is placed in such a stream portion as to maintain optimum pressure, temperature, and flow rate. Upon contacting between 302 and 303, catalytic conversion of 302 results in conversion of 302 to products $H_2O$, $CO_2$, and $N_2$ depicted as 304.

In contacting, the constituent pollutants of the reactant gas mixture are brought into chemical communication with the provided substituted MMO catalyst. Upon contacting, the pollutant and substituted MMO catalyst reactants undergo redox reactions to convert the pollutants to the relatively benign products. Exemplary reactions are: Selective Reduction of $NO_x$ and Oxidation of Hydrocarbons and CO.

In practicing the method, the contacting is performed while maintaining the reactant gas mixture and substituted MMO catalyst at conditions of temperature, pressure, and weight hourly space velocity to promote the catalytic conversion of the unconverted hydrocarbons, $CO_x$, $NO_x$, and particulate matter to produce $H_2O$, $CO_2$, $N_2$ or combinations thereof. Temperature conditions may range from about ambient (the environmental temperature surrounding a non-operating combustor) to about 2000° C. Preferably, temperature conditions are maintained from about 100 to about 1000° C.

Pressure conditions may range from about ambient (the environmental pressure surrounding a non-operating combustor) to about 11 MPa. Preferably, pressure conditions are maintained from about 0.2 to about 2 MPa.

The reactant gas mixture has a weight hourly space velocity, where a weight hourly space velocity is the ratio of the volumetric flow rate of the reactant gas to the weight of the catalyst. The weight hourly space velocity may range from about 10 to about $10^6$ scc/$g_{catalyst}$/hr between 10 to $10^6$ scc/$g_{catalyst}$/hr. Preferably, weight hourly space velocity ranges from about $10^3$ to about $10^5$ scc/$g_{catalyst}$/hr.

Example

The substituted MIO catalysts were demonstrated in reforming of diesel fuel exhaust in NETL labs for as long as 1000 hours at temperatures exceeding 900 C. In a long-term testing over 1000 hours, no deactivation was observed using a fuel containing 14 ppm sulfur. Pyrochlore catalysts with spatially distributed active metal components in a structure that resists decomposition at high temperatures are more durable and effective catalyst compared to simple supported metal clusters. Resistance to decomposition would maintain the spatially distributed active metal components as structural components in the pyrochlore, and significantly minimize the migration of active metal components to the surface. This could largely avoid the undesirable defacto formation of a supported metal catalyst of some initially oxide-based catalyst systems at the exhaust treatment conditions, and greatly reduce the tendency towards deactivation by carbon and sulfur. It would also hold potential as a long-life catalyst. Pyrochlores have inherent oxygen mobility, which can be enhanced by the substitution of various elements in both the A and B sites [Gaur et al. Applied catalysis A: general, Vol 403]. This is particularly important in the oxidation of diesel particulate matter that accumulates on the filter since it can increase the low temperature oxidation activity while also minimizing carbon deposition during normal operation.

Having described the basic concept of the embodiments, it will be apparent to those skilled in the art that the foregoing detailed disclosure is intended to be presented by way of example. Accordingly, these terms should be interpreted as indicating that insubstantial or inconsequential modifications or alterations and various improvements of the subject matter described and claimed are considered to be within the scope of the spirited embodiments as recited in the appended claims. Additionally, the recited order of the elements or sequences, or the use of numbers, letters or other designations therefor, is not intended to limit the claimed processes to any order except as may be specified.

All ranges disclosed herein also encompass any and all possible sub-ranges and combinations of sub-ranges thereof. Any listed range is easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as up to, at least, greater than, less than, and the like refer to ranges which are subsequently broken down into sub-ranges as discussed above. As utilized herein, the terms "about," "substantially," and other similar terms are intended to have a broad meaning in conjunction with the common and accepted usage by those having ordinary skill in the art to which the subject matter of this disclosure pertains. As utilized herein, the term "approximately equal to" shall carry the meaning of being within 15, 10, 5, 4, 3, 2, or 1 percent of the subject measurement, item, unit, or concentration, with preference given to the percent variance. It should be understood by those of skill in the art who review this disclosure that these terms are intended to allow a description of certain features described and claimed without restricting the scope of these features to the exact numerical ranges provided.

Accordingly, the embodiments are limited only by the following claims and equivalents thereto. All publications and patent documents cited in this application are incorporated by reference in their entirety for all purposes to the same extent as if each individual publication or patent document were so individually denoted.

We claim:

1. A method of catalytically converting a reactant gas mixture, the method comprising:
   supplying a reactant gas mixture comprising reactant gases comprising unconverted hydrocarbons, $CO_x$, $NO_x$, particulate matter, or combinations thereof;
   providing a substituted mixed-metal oxide catalyst;
   where the substituted mixed-metal oxide catalyst comprises a pyrochlore having the composition $A_{2-w-x}A'_{w}A''_{x}B_{2-y-z}B'_{y}B''_{z}O_{7-\Delta}$, wherein:
   A is a trivalent ion of an element selected from the group consisting of La, Ce, Pr, Nd, Pm, Sm, Eu, Gd, Tb, Dy, Er, Tm, Yb, Lu, Bi, Sc, Y, In, and Ti,
   A' is a trivalent ion of an element not equivalent to A and selected from the group consisting of La, Ce, Pr, Nd, Pm, Sm, Eu, Gd, Tb, Dy, Er, Tm, Yb, Lu, Bi, Sc, Y, In, and Ti, and wherein $0 \leq w \leq 1$,
   A" is a divalent ion selected from the group consisting of Mg, Ca, Sr, and Ba, and wherein $0 \leq x \leq 1$ and $w+x \leq 1$,
   B is a tetravalent ion of an element selected from the group consisting of Ti, Cr, Mn, Zr, Mo, Tc, Rh, Pd, Hf, Os, Ir, Pt, Si, Ge, Sn, and Pb,
   B' is a divalent, trivalent, or tetravalent ion of an element selected from the group consisting of Mo, Fe, Os, Ru, Co, Rh, Ir, Ni, Pd, Pt, Cu, Re, and V wherein if B' is a tetravalent element then B' is an element not equivalent to B and wherein $0 < y \leq 1$,
   B" is a divalent, a trivalent, or a tetravalent ion of an element selected from the group consisting of Mg, Ca, Sr, Ba, Y, Ce, Re, Cr, Ti, Zr, Hf, Ni, Co, V, and Mo, wherein if B" is a trivalent element, B" is an element not equivalent to B', and if B" is a tetravalent element, then B" is an element not equivalent to B' or B, wherein $0 \leq z < 1$ and $y+Z \leq 1$, and $\Delta$ is a number that renders the composition charge neutral, and
   where an average ionic radius ratio of ions in A, A', and A"-site holding an 8-fold coordination with oxygen to ions B, B', and B" site holding 6-fold coordination with oxygen is between 1.46 and 1.8;
   contacting the reactant gas mixture with the substituted mixed-metal oxide catalyst; and,
   maintaining the reactant gas mixture and the substituted mixed-metal oxide catalyst at conditions of temperature, pressure, and weight hourly space velocity during the contacting to promote the conversion of the reactant gases to produce $H_2O$, $CO_2$, Na or combinations thereof.

2. The method of claim 1 where the substituted mixed-metal oxide catalyst further comprises a surface deposited transition metal, alkali metal, alkaline earth metal, noble metal, lanthanide element, or mixtures thereof.

3. The method of claim 1 where the pyrochlore is a first pyrochlore, and where the substituted mixed-metal oxide catalyst further comprises a second pyrochlore, simple oxides, reduced metal, perovskite, fluorite, weberite, brownmillerite, or mixtures thereof.

4. The method of claim 1 wherein the substituted mixed-metal oxide catalyst further comprises a support.

5. The method of claim 4, wherein the support comprises alumina, silica, zirconium, titanium, zeolite, or a mixed metal oxide spinel, fluorite, perovskite, pyrochlore, brownmillerite, or mixtures thereof.

6. The method of claim 5 wherein the support is an oxygen conducting mixed-metal oxide.

7. The method of claim 4 where the pyrochlore is a first catalytically active material; and, where the substituted mixed-metal oxide catalyst further comprises a second catalytically active material.

8. The method of claim 7 where the second catalytically active material is deposited on the surface of the first catalytically active material.

9. The method of claim 8 where the second catalytically active material is a surface deposited transition metal, alkali metal, alkaline earth metal, noble metal, lanthanide element, or mixtures thereof.

10. The method of claim 1 wherein the substituted mixed-metal oxide catalyst is a powder, pellet, foam, honeycomb, or a monolith.

11. The method of claim 1 wherein the reactant gas mixture is a product of hydrocarbon fuel combustion.

12. The method of claim 11 wherein the hydrocarbon fuel is gasoline, diesel, jet fuel, JP fuel, tar, kerosene, or mixtures thereof.

13. The method of claim 1, wherein when A or A' is cerium, B or B" is not zirconium.

14. The method of claim 1, wherein the substituted mixed-metal oxide catalyst is structurally stable during said contacting.

\* \* \* \* \*